United States Patent
Callison et al.

(10) Patent No.: US 6,631,437 B1
(45) Date of Patent: Oct. 7, 2003

(54) METHOD AND APPARATUS FOR PROMOTING MEMORY READ COMMANDS

(75) Inventors: Ryan Callison, Spring, TX (US); Brian Hausauer, Spring, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 09/543,817

(22) Filed: Apr. 6, 2000

(51) Int. Cl.[7] .......................... G06F 13/20; G06F 13/36
(52) U.S. Cl. ...................... 710/313; 710/309; 710/310; 710/107
(58) Field of Search ............................... 710/310, 107, 710/313

(56) References Cited

U.S. PATENT DOCUMENTS 5,835,741 A * 11/1998 Elkhoury et al. ............ 710/310
6,092,141 A *  7/2000 Lange ......................... 710/310
6,199,131 B1 *  3/2001 Melo et al. .................. 710/107

OTHER PUBLICATIONS

Tom Shanley / Don Anderson, PCI System Architecture, 1995, MindShare, Inc., 3rd Edition, p. 131.*

* cited by examiner

*Primary Examiner*—Mark H. Rinehart
*Assistant Examiner*—Christopher E. Lee (57) ABSTRACT

A device for providing data includes a data source, a bus interface, a data buffer, and control logic. The bus interface is coupled to a plurality of control lines of a bus and adapted to receive a read request targeting the data source. The control logic is adapted to determine if the read request requires multiple data phases to complete based on the control lines, and to retrieve at least two data phases of data from the data source and store them in the data buffer in response to the read request requiring multiple data phases to complete. A method for retrieving data includes receiving a read request on a bus. The bus includes a plurality of control lines. It is determined if the read request requires multiple data phases to complete based on the control lines. At least two data phases of data are retrieved from a data source in response to the read request requiring multiple data phases to complete. The at least two data phases of data are stored in a data buffer.

4 Claims, 9 Drawing Sheets

METHOD AND APPARATUS FOR PROMOTING MEMORY READ COMMANDS

BACKGROUND OF THE INVENTION

1. Field of the Invention

This invention relates generally to communication between devices on different buses of a computer system, and, more particularly, to a method and apparatus for promoting memory read commands and advantageously prefetch data to reduce bus latency.

2. Description of the Related Art

Computer systems of the PC type typically employ an expansion bus to handle various data transfers and transactions related to I/O and disk access. The expansion bus is separate from the system bus or from the bus to which the processor is connected, but is coupled to the system bus by a bridge circuit.

A variety of expansion bus architectures have been used in the art, including the ISA (Industry Standard Architecture) expansion bus, an 8-Mhz, 16-bit device and the EISA (Extension to ISA) bus, a 32-bit bus clocked at 8-Mhz. As performance requirements increased, with faster processors and memory, and increased video bandwidth needs, high performance bus standard were developed. These standards included the Micro Channel architecture, a 10-Mhz, 32-bit bus; an enhanced Micro Channel, using a 64-bit data width and 64-bit data streaming; and the VESA (Video Electronics Standards Association) bus, a 33 MHz, 32-bit local bus specifically adapted for a 486 processor.

More recently, the PCI (Peripheral Component Interconnect) bus standard was proposed by Intel Corporation as a longer-tern expansion bus standard specifically addressing burst transfers. The original PCI bus standard has been revised several times, with the current standard being Revision 2.1, available from the PCI Special Interest Group, located in Portland, Oregon. The PCI Specification, Rev. 2.1, is incorporated herein by reference in its entirety. The PCI bus provides for 32-bit or 64-bit transfers at 33 or 66 MHz. It can be populated with adapters requiring fast access to each other and/or with system memory, and that can be accessed by the host processor at speeds approaching that of the processor's native bus speed. A 64-bit, 66-MHz PCI bus has a theoretical maximum transfer rate of 528 MByte/sec. All read and write transfers over the bus may be burst transfers. The length of the burst may be negotiated between initiator and target devices, and may be any length.

A CPU operates at a much faster clock rate and data access rate than most of the resources it accesses via a bus. In earlier processors, such as those commonly available when the ISA bus and EISA bus were designed, this delay in reading data from a resource on the bus was handled by inserting wait states. When a processor requested data that was not immediately available due to a slow memory or disk access, the processor merely marked time using wait states, doing no useful work, until the data finally became available. To make use of this delay time, a processor such as the Pentium Pro (P6), offered by Intel Corporation, provides a pipelined bus that allows multiple transactions to be pending on the bus at one time, rather than requiring one transaction to be finished before starting another. Also, the P6 bus allows split transactions, i.e., a request for data may be separated from the delivery of the data by other transactions on the bus. The P6 processor uses a technique referred to as "deferred transaction" to accomplish the split on the bus. In a deferred transaction, a processor sends out a read request, for example, and the target sends back a "defer" response, meaning that the target will send the data onto the bus, on its own initiative, when the data becomes available.

The PCI bus specification as set forth above does not provide for split transactions. There is no mechanism for issuing a "deferred transaction" signal, nor for generating the deferred data initiative. Accordingly, while a P6 processor can communicate with resources such as main memory that are on the processor bus itself using deferred transactions, this technique is not used when communicating with disk drives, network resources, compatibility devices, etc., on an expansion bus.

The PCI bus specification, however, provides a protocol for issuing delayed transactions. Delayed transactions use a retry protocol to implement efficient processing of the transactions. If an initiator initiates a request to a target and the target cannot provide the data quickly enough, a retry command is issued. The retry command directs the initiator to retry or "ask again" for the data at a later time. In delayed transaction protocol, the target does not simply sit idly by, awaiting the renewed request. Instead, the target initially records certain information, such as the address and command type associated with the initiator's request, and begins to assemble the requested information in anticipation of a retry request from the initiator. When the request is retried, the information can be quickly provided without unnecessarily tying up the system's buses.

Differentiated commands are used in accordance with the PCI specification to indicate, or at least hint at, the amount of data required by the initiator. A memory read (MR) command does not provide any immediate indication as to the length of the intended read. The read is terminated based on logic signals driven on the bus by the initiator. A memory read line (MRL) command, on the other hand, indicates that the initiator intends to read at least one cache line (e.g., 32 bytes) of data. A memory read multiple command (MRM) indicates that the initiator is likely to read more than one cache line of data. Based on the command received, the bridge prefetches data and stores it in a buffer in anticipation of the retried transaction. The amount of data prefetched depends on the amount the initiator is likely to require. Efficiency is highest when the amount of prefetched data most closely matches the amount of data required.

Prefetching in response to MRL and MRM commands is relatively uncomplicated, because, by the very nature of the command, the bridge knows to prefetch at least one, and likely more than one, cache line. The amount of data required by an initiator of an MR command, on the other hand, is not readily apparent. Initiators may issue MR commands even if they know they will require multiple data phases. For example, the PCI specification recommends, but does not require, that initiators use an MRL or an MRM command only if the starting address lies on a cache line boundary. Accordingly, a device following this recommendation would issue one or more MR commands until a cache line boundary is encountered, and would then issue the appropriate MRL or MRM command. Also, some devices, due to their vintage or their simplicity, are not equipped to issue MRL or MRM commands, and use MR commands exclusively.

To illustrate the difficulties of anticipating the amount of data required by the initiator of an MR command, FIGS. 1A through 1D provide timing diagrams of exemplary MR transactions on a PCI bus. For clarity, only those PCI control signals useful in illustrating the examples are shown. The PCI bus uses shared address/data (AD) lines and shared command/byte enable (C/BE#) lines. In accordance with the PCI specification, a turnaround cycle is required on all signals that may be driven by more than one agent. In the case of the AD lines, the initiator drives the address and the target drives the data. The turnaround cycle is used to avoid contention when one agent stops driving a signal and another agent begins driving the signal. A turnaround cycle is indicated on the timing diagrams as two arrows pointing at each others' tail.

Figure 1A:
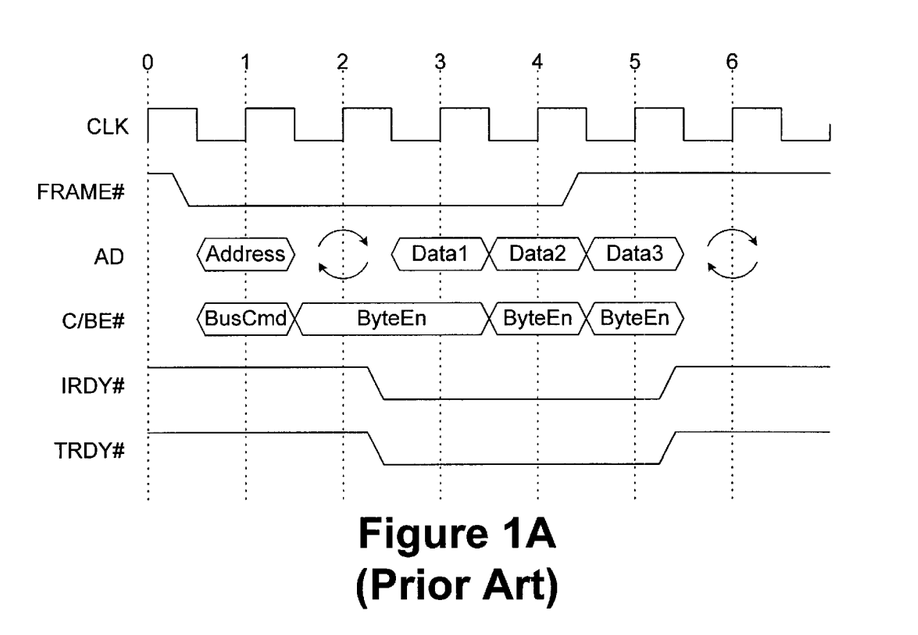
FIGS. 1A through 1D illustrate timing diagrams of typical prior art bus commands.

FIG. 1A illustrates an MR command in which the initiator requires multiple data phases to complete the transaction. In this illustration, the target and initiator reside on the same PCI bus, and the target is ready to supply the data when requested. The initiator asserts a FRAME# signal before the rising edge of a first clock cycle (CLK1) to indicate that valid address and command bits are present on the AD lines and the C/BE# lines, respectively. During a third cycle, CLK3, the initiator asserts the IRDY# signal to indicate that it is ready to receive data. The target also asserts the TRDY# signal at CLK3 (i.e., after the turnaround cycle) to signal that valid data is present on the AD lines. In accordance with the PCI specification, the initiator must deassert FRAME# before the last data phase. Because the FRAME# signal remains asserted at CLK3, the target knows that more data is required. Data transfer continues between the initiator and target during cycles CLK4 and CLK5. The initiator deasserts the FRAME# signal before CLK5 to indicate that Data3 is the last data phase. The initiator continues to assert the IRDY# signal until after the last data phase has been completed.

Figure 1B:
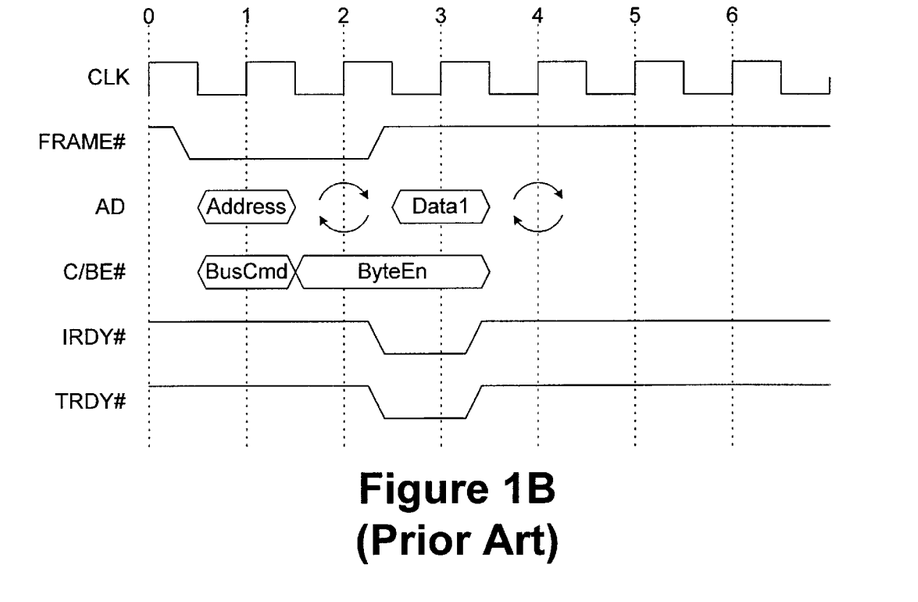

FIG. 1B illustrates an MR command in which the initiator requires only one data phase to complete the transaction. Again, the initiator asserts the FRAME# signal before the rising edge of the first clock cycle (CLK1) to indicate that valid address and command bits are present on the AD lines and the C/BE# lines, respectively. During the third cycle, CLK3, the initiator asserts the IRDY# signal to indicate that it is ready to receive data. The target asserts the TRDY# signal at CLK3 (i.e., after the turnaround cycle) to signal that valid data is present on the AD lines. Because the initiator must deassert frame before the last data phase, the FRAME# signal is deasserted before CLK3. The target then knows that no more data is required. The initiator continues to assert the IRDY# signal during the transfer of the data at CLK3, and deasserts it thereafter.

Figure 1C:
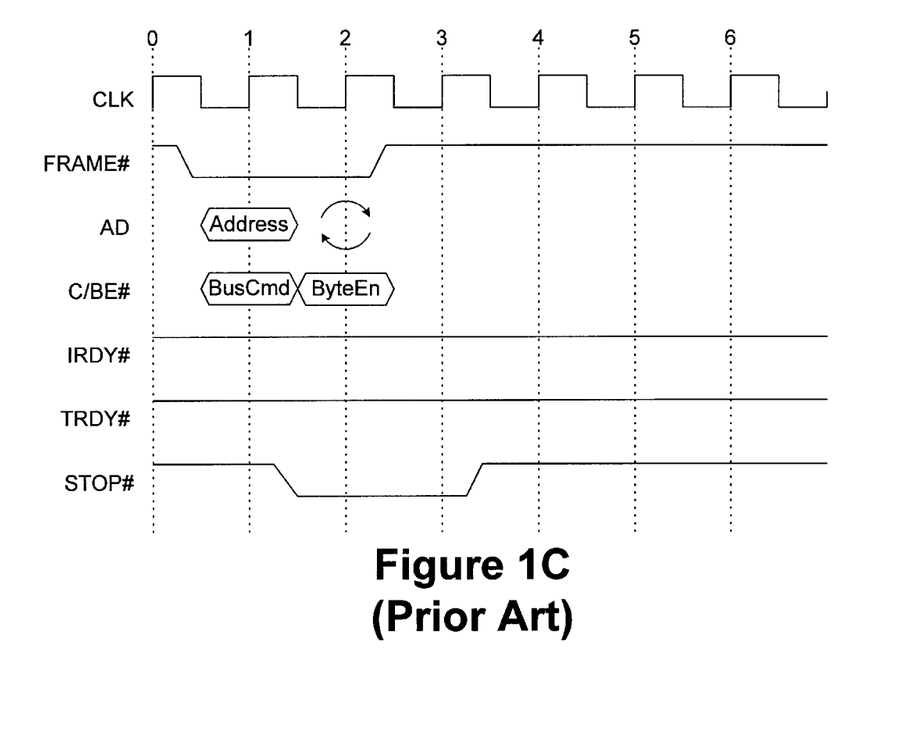
Figure 1D:
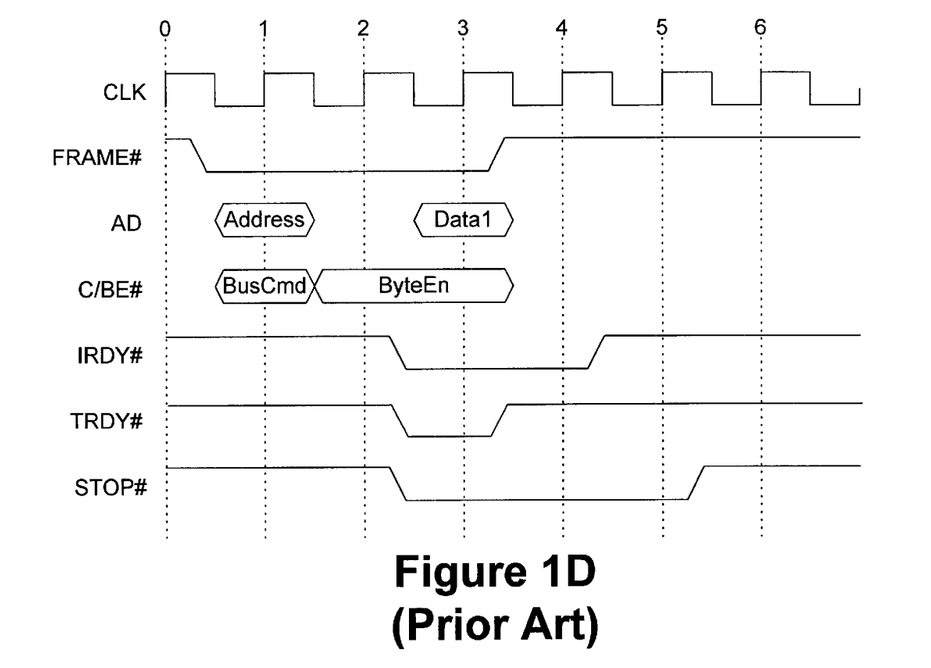

From the examples of FIGS. 1A and 1B, it is clear that the determination of the amount of data required by the initiator may not be determined until well into the transaction. FIGS. 1A and 1B illustrated MR transaction between devices on the same PCI bus. FIGS. 1C and 1D illustrates an MR transaction where the target resides on a different PCI bus than the initiator, and is subordinate to a bridge device.

As shown in FIG. 1C, the initiator asserts the FRAME# signal before the rising edge of the first clock cycle (CLK1) to indicate that valid address and command bits are present on the AD lines and the C/BE# lines, respectively. The bridge claims the transaction, and because no data is readily available forces a retry by asserting the STOP# signal during CLK2. In response to the STOP# signal, the initiator deasserts the FRAME# signal before CLK3. The bridge then deasserts STOP# at CLK4. The bridge, not knowing how much data the initiator requires, conservatively assumes the transaction is a single data phase transaction and retrieves the data.

At some later time, as shown in FIG. 1D, the initiator retries the request. Again, the initiator asserts the FRAME# signal before the rising edge of the first clock cycle (CLK1) to indicate that valid address and command bits are present on the AD lines and the C/BE# lines, respectively. The bridge, now in possession of the data, allows the transaction to proceed. During the third cycle, CLK3, the initiator asserts the IRDY# signal to indicate that it is ready to receive data. The bridge asserts the TRDY# signal at CLK3 to signal that valid data is present on the AD lines. The bridge also asserts the STOP# signal at CLK3 to indicate it cannot provide any further data. Even though the initiator desired more than one data phase to complete the transaction, as indicated by the FRAME# signal being asserted during the transfer of Data1, the transaction is terminated.

The initiator is then forced to issue a new transaction, in accordance with FIG. 1C for the next data phase. The cycle of FIGS. 1C and 1D repeats until the initiator has received its requested data. The situation of FIGS. 1C and 1D illustrate an inefficiency introduced by the use of an MR command. It may take many such exchanges to complete the data transfer, thus increasing the number of tenancies (ie., exchanges between an initiator and a target) on the bus. Also, the initiator, bridge, and target must compete for bus time with other devices on their respective buses, thus increasing the total number of cycles required to complete the transaction beyond those required just to complete the evolutions of FIGS. 1C and 1D.

Techniques have been developed in the art to attempt to increase the efficiency of MR transactions traversing bridges. One such technique involves storing an MR promotion bit for each of the devices subordinate to a bridge in the private configuration space of the bridge. If the bit is asserted, MR commands are automatically promoted, and multiple data phases of data are prefetched. The decision on whether to set the promotion bit depends on knowledge of the device being accessed. Certain devices have undesirable read "side effects." For example, an address might refer to a first-in-first-out (FIFO) register. A read to a FIFO increments the pointer of the FIFO to the next slot. If the prefetching conducted in response to the assertion of the promotion bit hits the address of the FIFO, it would increment, and a subsequent read targeting the FIFO would retrieve the wrong data, possible causing undesirable operation or a deadlock condition. Memory regions with such undesirable side effects are referred to as non-speculative regions, and memory regions where prefetching is allowable is referred to as speculative memory regions.

The present invention is directed to overcoming, or at least reducing the effects of, one or more of the problems set forth above.

SUMMARY OF THE INVENTION

One aspect of the present invention is seen in a device for providing data. The device includes a data source, a bus interface, a data buffer, and control logic. The bus interface is coupled to a plurality of control lines of a bus and adapted to receive a read request targeting the data source. The control logic is adapted to determine if the read request requires multiple data phases to complete based on the control lines, and to retrieve at least two data phases of data from the data source and store them in the data buffer in response to the read request requiring multiple data phases to complete.

Another aspect of the present invention is seen in a method for retrieving data. The method includes receiving a read request on a bus. The bus includes a plurality of control lines. It is determined if the read request requires multiple data phases to complete based on the control lines. At least two data phases of data are retrieved from a data source in response to the read request requiring multiple data phases to complete. The at least two data phases of data are stored in a data buffer.

BRIEF DESCRIPTION OF THE DRAWINGS

The invention may be understood by reference to the following description taken in conjunction with the accompanying drawings, in which like reference numerals identify like elements, and in which.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF SPECIFIC EMBODIMENTS

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

Figure 2:
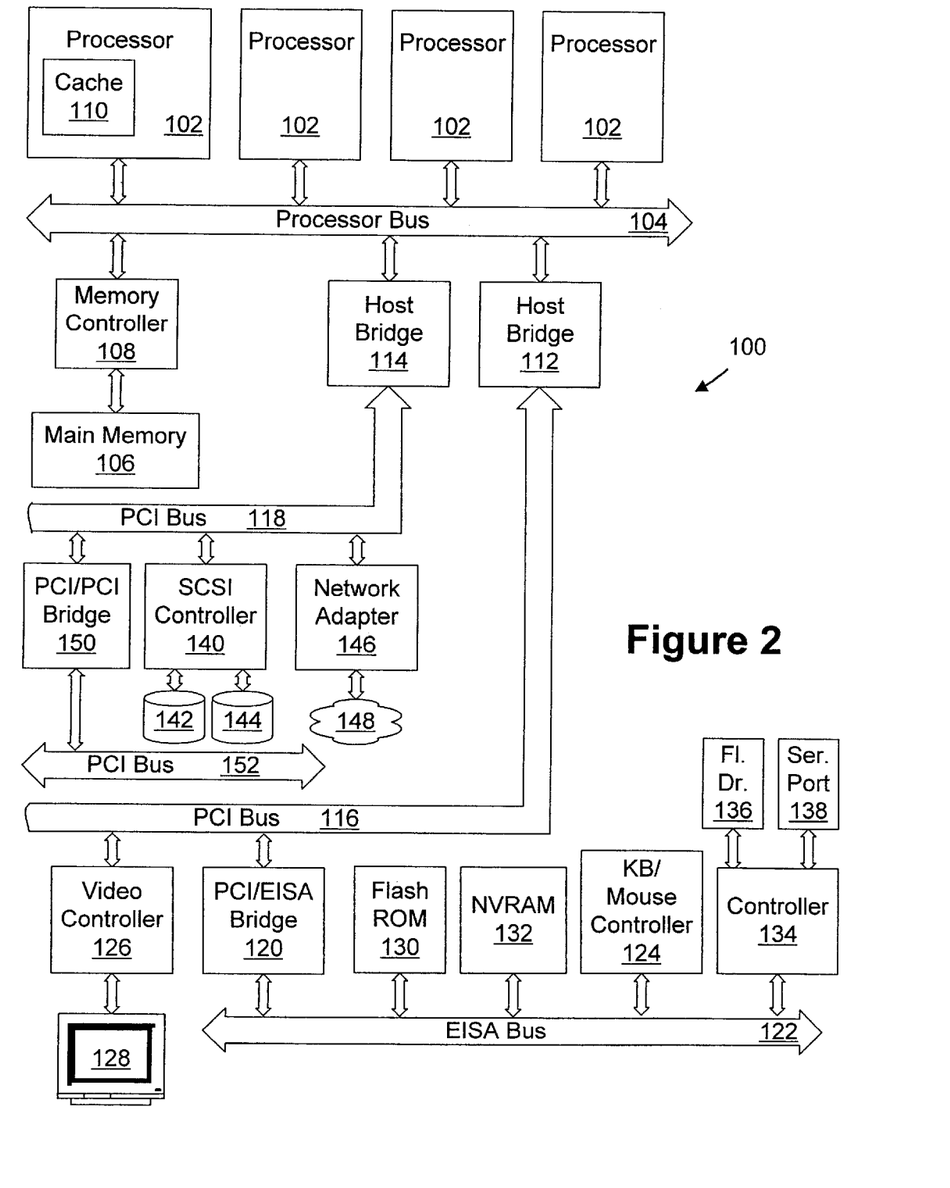
FIG. 2 is a simplified block diagram of a computer system in accordance with the present invention.

Referring to FIG. 2, a computer system 100 in accordance with the present invention is shown. The computer system 100 includes multiple processors 102 in the illustrated example, although more or less may be employed. The processors 102 are connected to a processor bus 104. The processor bus 104 operates based on the processor clock (not shown), so if the processors 102 are 166 MHz or 200 MHz devices (e.g., the clock speed of a Pentium Pro processor), for example, then the processor bus 104 is operated on some multiple of the base clock rate. A main memory 106 is coupled to the processor bus 104 through a memory controller 108. In the illustrated embodiment, the processors 102 each have a level-two cache 110 as a separate chip within the same package as the CPU chip itself, and the CPU chips have level-one data and instruction caches (not shown) included on-chip.

Host bridges 112, 114 are provided between the processor bus 104 and the PCI buses 116, 118, respectively. Two host bridges 112 and 114 are shown, although it is understood that many computer systems 100 would require only one, and other computer system 100 may use more than two. In one example, up to four of the host bridges 112, 114 may be used. The reason for using more than one host bridge 112, 114 is to increase the potential data throughput. One of the host bridges 112 is designated as a primary bridge, and the remaining bridges 114 (if any) are designated as secondary bridges.

The primary host bridge 112, in the illustrated example, carries traffic for "legacy" devices, such as an EISA bridge 120 coupled to an EISA bus 122, a keyboard/mouse controller 124, a video controller 126 coupled to a monitor 128, a flash ROM 130, a NVRAM 132, and a controller 134 for a floppy drive 136 and serial/parallel ports 138. The secondary host bridge 114 does not usually accommodate any PC legacy items. Coupled to the PCI bus 118 by the host bridge 114 to the processor bus 104 are other resources such as a SCSI disk controller 140 for hard disk resources 142, 144, and a network adapter 146 for accessing a network 148. A potentially large number of other stations (not shown) are coupled to the network 148. Thus, transactions on the buses 104, 116, 118 may originate in or be directed to another station (not shown) or server (not shown) on the network 148.

The computer system 100 embodiment illustrated in FIG. 1 is that of a server, rather than a standalone computer system, but the features described herein may be used as well in a workstation or standalone desktop computer. Some components, such as the controllers 124, 140, 146 may be cards fitted into PCI bus slots (not shown) on the motherboard (not shown) of the computer system 100. If additional slots (not shown) are needed, a PCI-to-PCI bridge 150 may be placed on the PCI bus 118 to access another PCI bus 152. The additional PCI bus 152 does not provide additional bandwidth, but allows more adapter cards to be added. Various other server resources can be connected to the PCI buses 116, 118, 152 using commercially-available controller cards, such as CD-ROM drives, tape drives, modems, connections to ISDN lines for internet access, etc. (all not shown).

Traffic between devices on the concurrent PCI buses 116, 118 and the main memory 106 must traverse the processor bus 104. Peer-to-peer transactions are allowed between a master and target device on the same PCI bus 116, 118, and are referred to as "standard" peer-to-peer transactions. Transactions between a master on one PCI bus 116 and a target device on another PCI bus 118 must traverse the processor bus 104, and these are referred to as "traversing" transactions.

Figure 3A:
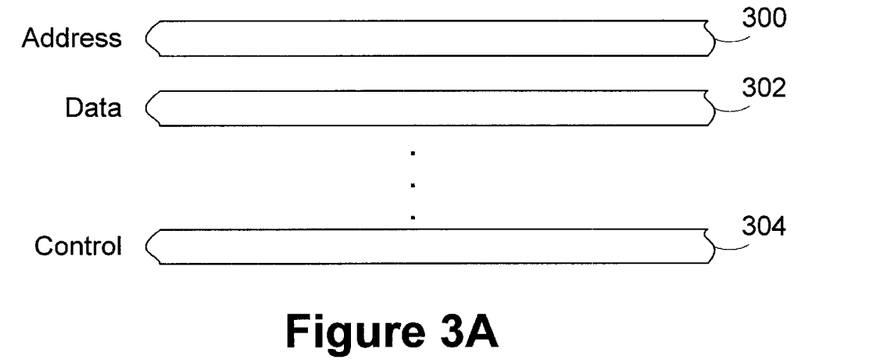
FIG. 3A is a diagram illustrating typical lines included in a processor bus of FIG. 2.

Referring briefly to FIG. 3A, the processor bus 104 contains a number of standard signal or data lines as defined in the specification for the particular processor 102 being used. In addition, certain special signals are included for the unique operation of the bridges 112, 114. In the illustrated embodiment, the processor bus 104 contains thirty-three address lines 300, sixty-four data lines 302, and a number of control lines 304. Most of the control lines 304 are not required to promote understanding of the present invention, and, as such, are not described in detail herein. Also, the address and data lines 300, 302 have parity lines (not shown) associated with them that are also not described.

Figure 3B:
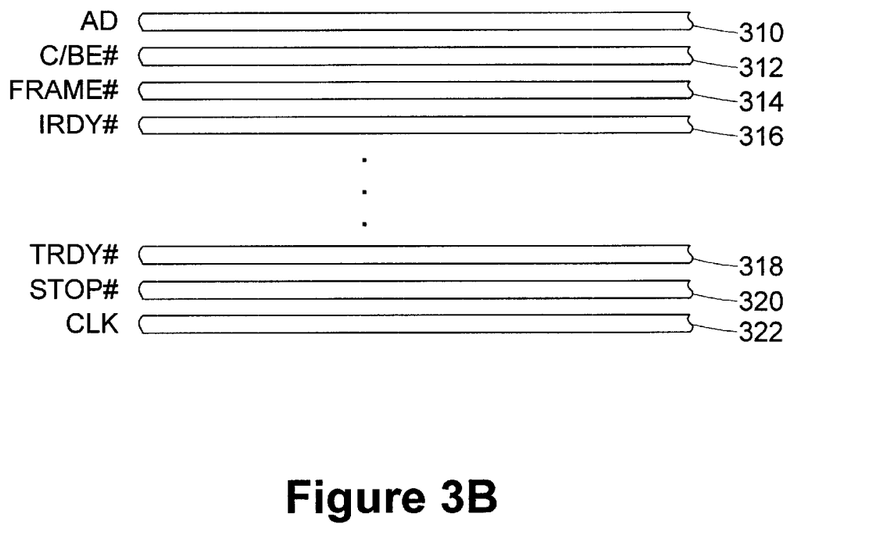
FIG. 3B is a diagram illustrating typical lines included in a peripheral component interconnect bus of FIG. 2.

Referring now to FIG. 3B, the PCI buses 116, 118, 152 also contain a number of standard signal and data lines as defined in the PCI specification. The PCI buses 116, 118, 152 are of a multiplexed address/data type, and contain sixty-four AD lines 310, eight command/byte-enable lines 312, and a number of control lines (enumerated below). The particular control lines used in the illustration of the present invention are a frame line 314 (FRAME#), an initiator ready line 316 (IRDY#), a target ready line 318 (TRDY#), a stop line 320 (STOP#), and a clock line 322 (CLK).

Figure 4:
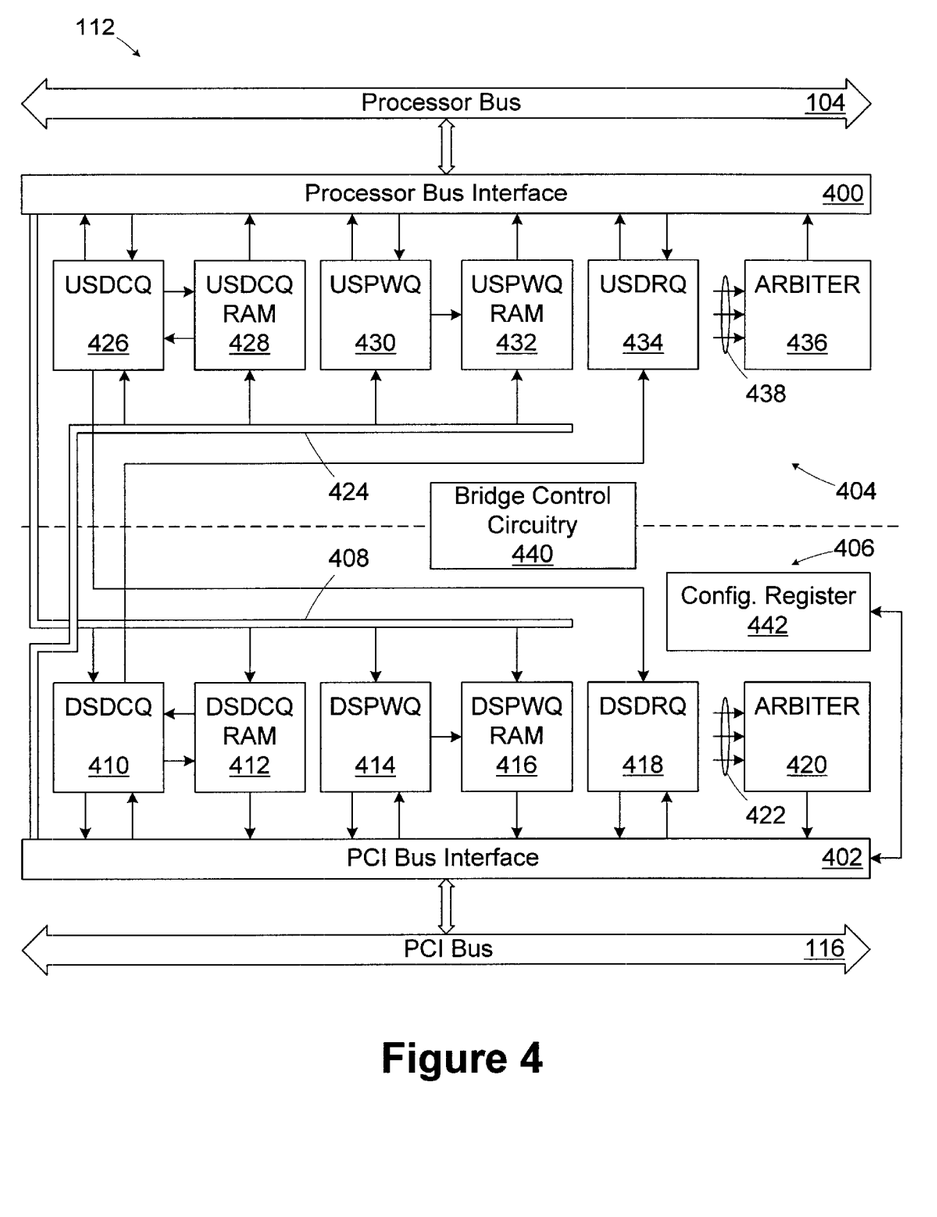
FIG. 4 is a simplified block diagram of a bridge device of FIG. 2.

Turning now to FIG. 4, a simplified block diagram showing the host bridge 112 in greater detail is provided. The host bridge 114 is of similar construction to that of the host bridge 112 depicted in FIG. 4. For simplicity, the host bridge 112 is hereinafter referred to as the bridge 112. The bridge 112 includes a processor bus interface circuit 400 serving to acquire data and signals from the processor bus 104 and to drive the processor bus 104 with signals and data. A PCI bus interface circuit 402 serves to drive the PCI bus 116 and to acquire signals and data from the PCI bus 116. Internally, the bridge 112 is divided into an upstream queue block 404 (US QBLK) and a downstream queue block 406 (DS QBLK). The term downstream refers to any transaction going from the processor bus 104 to the PCI bus 116, and the term upstream refers to any transaction going from the PCI bus 116 back toward the processor bus 104. The bridge 112 interfaces on the upstream side with the processor bus 104 which operates at a bus speed related to the processor clock rate, which is, for example, 133 MHz, 166 MHz, or 200 MHz for Pentium Pro processors 102. On the downstream side, the bridge 112 interfaces with the PCI bus 116 operating at 33 or 66 MHz. These bus frequencies are provided for illustrative purposes. Application of the invention is not limited by the particular bus speeds selected.

One function of the bridge 112 is to serve as a buffer between asynchronous buses 104, 116, and buses that differ in address/data presentation, i.e., the processor bus 104 has separate address and data lines 300, 302, whereas the PCI bus 116 uses multiplexed address and data lines 310. To accomplish these translations, all bus transactions are buffered in FIFOs.

For transactions traversing the bridge 112, all memory writes are posted writes and all reads are split transactions. A memory write transaction initiated by one of the processors 102 on the processor bus 104 is posted to the processor bus interface circuit 400, and the processor 102 continues with instruction execution as if the write had been completed. A read requested by one of the processors 102 is not immediately implemented, due to mismatch in the speed of operation of all of the data storage devices (except for caches) compared to the processor speed, so the reads are all treated as split transactions. An internal bus 408 conveys processor bus 104 write transactions or read data from the processor bus interface circuit 400 to a downstream delayed completion queue (DSDCQ) 410 and its associated RAM 412, or to a downstream posted write queue (DSPWQ) 414 and its associated RAM 416. Read requests going downstream are stored in a downstream delayed request queue (DSDRQ) 418. An arbiter 420 monitors all pending downstream posted writes and read requests via valid bits on lines 422 in the downstream queues 410, 414, 418 and schedules which one will be allowed to execute next on the PCI bus 116 according to the read and write ordering rules set forth in the PCI bus specification. The arbiter 420 is coupled to the PCI bus interface circuit 402 for transferring commands thereto.

The components of the upstream queue block 404 are similar to those of the downstream queue block 406, i.e., the bridge 112 is essentially symmetrical for downstream and upstream transactions. A memory write transaction initiated by a device on the PCI bus 116 is posted to the PCI bus interface circuit 402 and the master device proceeds as if the write had been completed. A read requested by a device on the PCI bus 116 is not implemented at once by a target device on the processor bus 104, so these reads are again treated as delayed transactions. An internal bus 424 conveys PCI bus write transactions or read data from the PCI bus interface circuit 402 to an upstream delayed completion queue (USDCQ) 426 and its associated RAM 428, or to an upstream posted write queue (USPWQ) 430 and its associated RAM 432. Read requests going upstream are stored in an upstream delayed request queue (USDRQ) 434. An arbiter 436 monitors all pending upstream posted writes and read requests via valid bits on lines 438 in the upstream queues 426, 430, 434 and schedules which one will be allowed to execute next on the processor bus 104 according to the read and write ordering rules set forth in the PCI bus specification. The arbiter 436 is coupled to the processor bus interface circuit 400 for transferring commands thereto.

The structure and functions of the FIFO buffers or queues in the bridge 112 is now described. Each buffer in a delayed request queue 418, 434 stores a delayed request that is waiting for execution, and this delayed request consists of a command field, an address field, a write data field (not required if the request is a read request), and a valid bit. The USDRQ 434 holds requests originating from masters on the PCI bus 116 and directed to targets on the processor bus 104 or the PCI bus 118. In the illustrated embodiment, the USDRQ 434 and has eight buffers, corresponding one-to-one with eight buffers in the DSDCQ 410. The DSDRQ 418 holds requests originating on the processor bus 104 and directed to targets on the PCI bus 116. In the illustrated embodiment, the DSDRQ 418 and has four buffers, corresponding one-to-one with four buffers in the USDCQ 426. The DSDRQ 418 is loaded with a request from the processor bus interface circuit 400 and the USDCQ 426. Similarly, the USDRQ 434 is loaded from the PCI bus interface circuit 402 and the DSDCQ 410. Requests are routed through the DCQ 410, 426 logic to identify if a read request is a repeat of a previously encountered request. Thus, a read request from the processor bus 104 is latched into the processor bus interface circuit 400 and the transaction information is applied to the USDCQ 426, where it is compared with all enqueued prior downstream read requests. If the current request is a duplicate, it is discarded if the data is not yet available to satisfy the request. If it is not a duplicate, the information is forwarded to the DSDRQ 418. The same mechanism is used for upstream read requests. Information defining the request is latched into the PCI bus interface circuit 402 from the PCI bus 116, forwarded to DSDCQ 410, and, if not a duplicate of an enqueued request, forwarded to USDRQ 434.

The delayed completion queues 410, 426 and their associated dual port RAMs 412, 428 each store completion status and read data for delayed requests. When a delayable request is sent from one of the interfaces 400 or 402 to the queue block 404 or 406, the appropriate DCQ 410, 426 is queried to see if a buffer for this same request has already been allocated. The address, commands, and byte enables are checked against the buffers in DCQ 410 or 426. If no match is identified, a new buffer is allocated (if available), and the request is delayed (or deferred for the processor bus 104). The request is forwarded to the DRQ 418 or 434 in the opposite side. The request is then executed on the opposite bus 104, 116, under control of the appropriate arbiter 420, 436, and the completion status and data are forwarded back to the appropriate DCQ 410, 426. After status/data are placed in the allocated buffer in the DCQ 410, 426 in this manner, the buffer is not valid until ordering rules are satisfied. For example, a read cannot be completed until previous writes are completed. When a delayable request "matches" a DCQ 410, 426 buffer, and the requested data is valid, the request cycle is ready for immediate completion.

The DSDCQ 410 stores status/read data for PCI-to-host delayed requests, and the USDCQ 426 stores status/read data for Host-to-PCI delayed or deferred requests. Each DSDCQ 410 buffer stores eight cache lines (256-bytes of data), and there are eight buffers (total data storage=2 kB). The four buffers in the USDCQ 426, on the other hand, each store only 32 bytes (i.e., a cache line) of data (total data storage=128-Bytes). The upstream and downstream operation is slightly different in this regard.

The bridge 112 includes bridge control circuitry 440 that prefetches data into the DSDCQ buffers 410 on behalf of the master, attempting to stream data with zero wait states after the delayed request completes. The DSDCQ 410 buffers are kept coherent with the processor bus 104 via snooping, which allows the buffers to be discarded as seldom as possible. Requests going the other direction may use prefetching, as described in greater detail below, however, since many PCI memory regions have "read side effects" (e.g., stacks and FIFOs), the bridge control circuitry 440 attempts to prefetch data into these buffers on behalf of the master only under controlled circumstances. In the illustrated embodiment, the USDCQ 426 buffers are flushed as soon as their associated deferred reply completes.

The posted write queues 414, 430 and their associated dual port RAM memories 416, 432 commands and data associated with transactions. Only memory writes are posted, i.e., writes to I/O space are not posted. Because memory writes flow through dedicated queues within the bridge, they cannot be blocked by delayed requests that precede them, as required by the PCI specification. Each of the four buffers in DSPWQ 414 stores 32 bytes (i.e., a cache line) of data plus commands for a host-to-PCI write. The four buffers in the DSPWQ 414 provide a total data storage of 128 bytes. Each of the four buffers in USPWQ 430 stores 256 bytes of data plus commands for a PCI-to-host write, i.e., eight cache lines (total data storage=1 kB). Burst memory writes that are longer than eight cache lines may cascade continuously from one buffer to the next in the USPWQ 430. Often, an entire page (e.g., 4 kB) is written from the disk 142 to the main memory 106 in a virtual memory system that is switching between tasks. For this reason, the bridge 112 has more capacity for bulk upstream memory writes than for downstream writes.

The arbiters 420 and 436 control event ordering in the QBLKs 404, 406. These arbiters 420, 436 make certain that any transaction in the DRQ 418, 434 is not attempted until posted writes that preceded it are flushed, and that no datum in a DCQ 410, 426 is marked valid until posted writes that arrived in the QBLK 404, 406 ahead of it are flushed.

As described above, there is a risk associated with prefetching data in response to an upstream read command due to potential side effects. However, the conservative approach of never prefetching for upstream reads, as illustrated in FIGS. 1A through 1D, results in costly inefficiencies. The risk of prefetching is lessened if the anticipated behavior of the initiator can be predicted. For example, if an initiator issues an MR command, and it can be identified that the initiator is requesting more than one data phase of data, it is more likely that prefetching data will not cause an unintended side effect.

Figure 5:
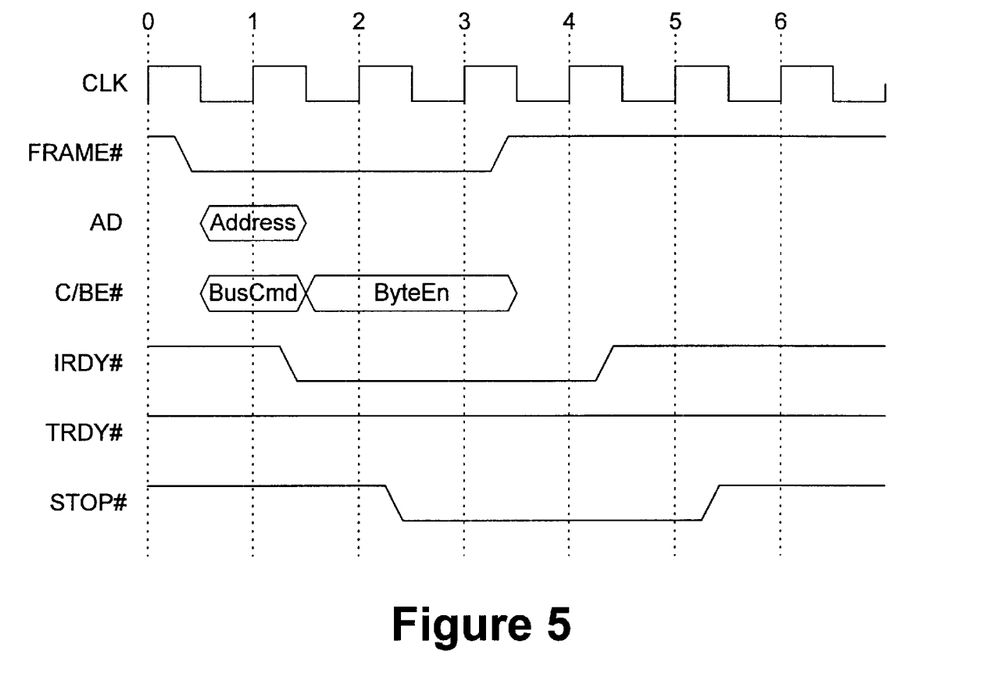
FIGS. 5 through 7 are timing diagrams of bus transactions in accordance with the present invention.
Figure 6:
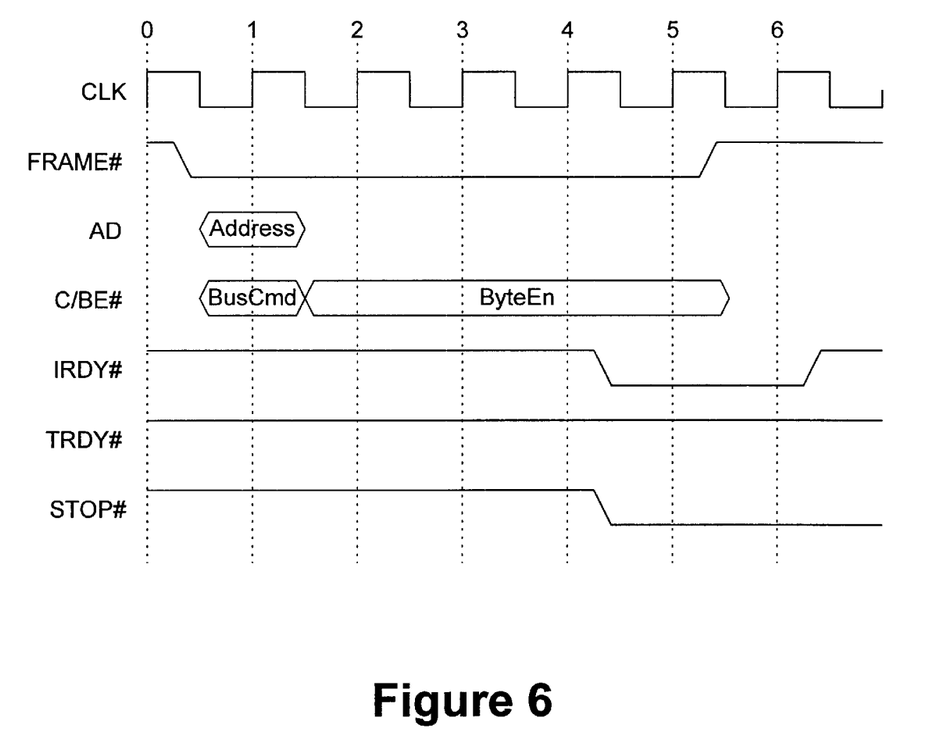
Figure 7:
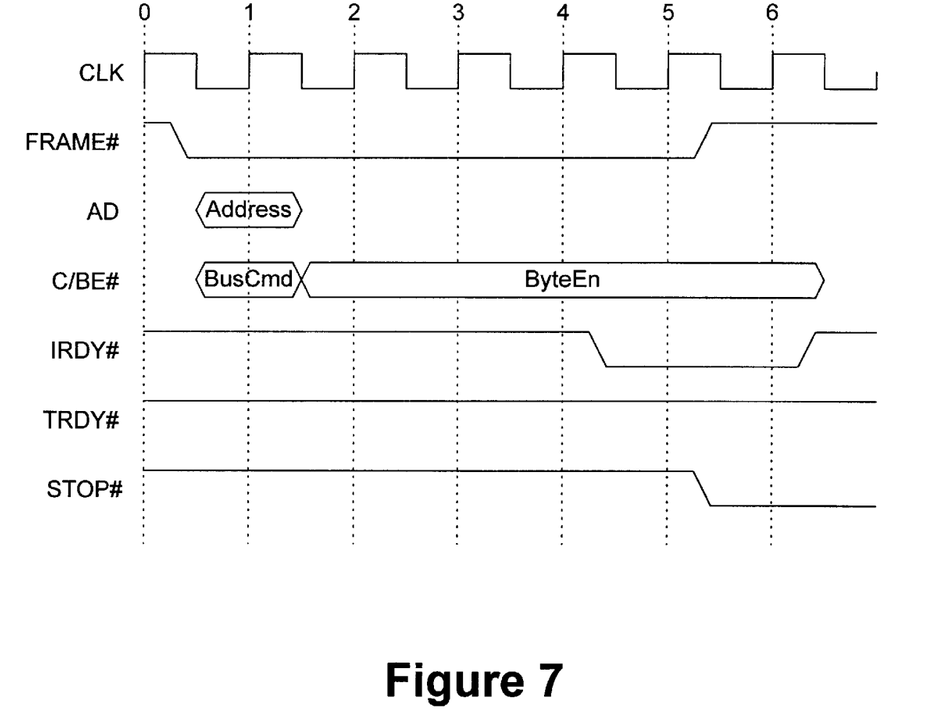

The bridge control circuitry 440, as described in reference to FIGS. 5, 6, and 7, is adapted to detect if an initiator intends to retrieve multiple phases of data with a burst MR command. There are numerous techniques for making such a determination, and several are described herein for illustrative purposes. As described above, it often takes multiple clock cycles before the behavior of an initiator can be determined. The techniques described below, although using different approaches, attempt to identify the intentions of an initiator with respect to the number of data phases desired and prefetch data, if possible, to reduce the inefficiencies described above. In response to determining that the initiator intends to complete multiple data phases, the bridge control circuitry 440 prefetches multiple data phases of data and stores them in the appropriate DCQ 410, 420 associated with the transaction.

A first illustrative technique involves evaluating the behavior of the initiator when the bridge issues a retry request (i.e., by asserting the STOP# signal). FIG. 5 illustrates a timing diagram of a read transaction traversing the bridge 112. The initiator asserts the FRAME# signal before the rising edge of the first clock cycle (CLK1) to indicate that valid address and command bits are present on the AD lines and the C/BE# lines, respectively. The bridge 112 claims the transaction, and because no data is readily available forces a retry by asserting the STOP# signal during CLK3. When the STOP# signal is asserted, the bridge control circuitry 440 samples the FRAME# signal and the IRDY# signal to determine the intentions of the initiator with respect to the number of data phases requested. As described above in reference to FIG. 1B, an initiator requesting a single data phase must deassert the FRAME# signal before asserting the IRDY# signal to signify that the last data phase is being requested. In FIG. 5, coincident with the STOP# signal, the FRAME# signal and the IRDY# signal are both asserted, indicating that the initiator intends to request multiple data phases. Accordingly, the bridge control circuitry 440 prefetches more than just a single data phase of data in anticipation of the impending retry by the initiator. If the FRAME# signal was found to be deasserted when the STOP# signal was asserted, the bridge control circuitry 440 retrieves only one data phase of data. Approaches for determining the amount of data to prefetch are discussed in greater detail below.

A second illustrative technique involves monitoring the behavior of the initiation for a predetermined number of clock cycles after the FRAME# signal is asserted to identify if the initiator commits to multiple data phases. In the illustrated embodiment, the predetermined number of clock cycles is three. FIG. 6 is a timing diagram illustrating this technique. Again, the initiator asserts the FRAME# signal before the rising edge of the first clock cycle (CLK1) to indicate that valid address and command bits are present on the AD lines and the C/BE# lines, respectively. The bridge 112 claims the transaction, and monitors the behavior of the initiator to determine if the initiator commits to multiple data phases on or before the third clock cycle following the assertion of the FRAME# signal (ie., CLK4). If the initiator does not commit prior to the third clock cycle, the bridge control circuitry 440 assumes a single data phase is required, and fetches only one data phase of data.

The PCI specification does not impose a requirement on the initiator to assert the IRDY# signal within a certain number of clock cycles after asserting the FRAME# signal. In FIG. 6, the initiator does not assert the IRDY# signal until after CLK4, and thus, at the determination point, the bridge control circuitry 440 determines that the initiator has not committed to a multiple phase transfer and assumes that a single data phase is required. It is evident from the behavior of the initiator after CLK4 that the initiator intended to transfer during more than one data phase (i.e., the FRAME# signal and the IRDY# signal are both asserted at CLK5, but this intention is not detected by the bridge control circuitry 440. Instead, the bridge control circuitry 440 asserts the STOP# signal at CLK5 in response to the lack of commitment on the part of the initiator prior to CLK4.

If the initiator had responded in the manner previously described in FIG. 5, the bridge control circuitry 440 would have detected the initiators multiple phase intention at CLK2, and would have asserted the STOP# signal at CLK3, without waiting the predetermined number of clock cycles.

A tradeoff exists between the number of cycles selected for evaluation and the accuracy of the determination of the initiator's intention. A larger number of clock cycles yields more accurate prediction, but takes longer to complete.

A third illustrative technique involves simply sampling the FRAME# signal when the initiator asserts the IRDY# signal. If the FRAME# signal is asserted coincident with the IRDY# signal, as evident at CLK5 of FIG. 7, the initiator has committed to a multiple data phase transfer. Accordingly, the bridge control circuitry 440 asserts the STOP# signal at CLK6, following the positive determination, and proceeds to prefetch multiple phases of data. This technique, although the most accurate, has the potential to introduce the most latency, as there is no restriction imposed by the PCI specification on the time between the assertion of the FRAME# signal and the subsequent assertion of the IRDY# signal.

The choice of how much data to prefetch in response to determining that the initiator intends to complete multiple data phases is application dependent. The bridge control circuitry 440 might prefetch up to the next cache line boundary, the next 512 byte boundary, or the next 4 kB boundary. Alternatively, the amount of data might depend on the available space in the bridge 112.

To further safeguard against unintentionally prefetching a region with read side effects, a device in the computer system 100 knowingly accessing a non-speculative region should be restricted to using only single data phase MR commands. In other words, multiple data phase read commands should be reserved only for accessing known speculative memory regions.

The bridge includes a configuration register 442 for selectively enabling or disabling the MR promotion function of the bridge control circuitry 440 for any or all of the PCI slots (not shown) subordinate to the bridge 112. The configuration register 442 stores a plurality of MR promotion bits, one for each subordinate device in its private configuration space. During power-up, configuration software executing on the computer system 100 may choose to enable or disable the MR promotion function for each of the slots. The configuration software determines the type of device installed, and may compare this determination against a list of devices known to function well with MR promotion, or alternatively, to a list of devices known to have problems with MR promotion.

Although the preceding description focused on the application of the MR promotion techniques in a bridge 112, it is contemplated that the technique may be employed in any number of devices. For example, the hard disk resource 142, 144 may have a high latency as compared to the other devices accessing it. The hard disk resource 142, 144 may implement a buffering technique at least partially similar to that used in the bridge 112, wherein a retry is forced while the data is buffered. The hard disk resource 142, 144 may advantageously use the MR promotion techniques described herein to reduce latencies and/or tenancies on its associated bus 118. Such latency issues may be encountered when dealing with devices resident on the network 148 and accessing data present somewhere on the computer system 100. Accordingly, the network adapter 146 may advantageously implement MR promotion techniques. As such, MR promotion may be used in peer-to-peer transaction, as well as traversing transactions. Generally speaking, any device controlling data may implement MR promotion techniques in response to any received read transaction for which data is not immediately available.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed:

1. A bridge device for communicating between a first and a second bus, comprising:

a bus interface coupled to a plurality of control lines of the first bus and adapted to receive a read request targeting the second bus, wherein the control lines include a frame line and an initiator ready line;

a data buffer; and control logic adapted to determine if the read request requires multiple data phases to complete based on the control lines, and to retrieve at least two data phases of data from the second bus and store them in the data buffer in response to the read request requiring multiple data phases to complete;

wherein the control logic is adapted to sample a frame signal on the frame line and an initiator ready signal on the initiator ready line to determine if the read request requires multiple data phases and to determine that the read request requires multiple data phases in response to the frame signal and the initiator ready signal being asserted concurrently within a predetermined number of clock cycles; and wherein the control logic is adapted to retrieve only one phase of data in response to the frame signal and the initiator ready signal not being asserted concurrently within the predetermined number of clock cycles.

2. A device for providing data, comprising:

a data source;

a bus interface coupled to a plurality of control lines of a bus and adapted to receive a read request targeting a data source, wherein the control lines include a frame line and an initiator ready line;

a data buffer; and control logic adapted to determine if the read request requires multiple data phases to complete based on the control lines, and to retrieve at least two data phases of data from the data source and store them in the data buffer in response to the read request requiring multiple data phases to complete;

wherein the control logic also is adapted to sample a frame signal on the frame line and an initiator ready signal on the initiator ready line to determine whether the read request requires multiple data phases in response to the frame signal and the initiator ready signal being asserted concurrently within a predetermined number of clock cycles; and wherein the control logic is adapted to retrieve only one phase of data in response to the frame signal and the initiator ready signal not being asserted concurrently within the predetermined number of clock cycles.

3. A method for retrieving data, comprising:

receiving a read request on a bus, the bus including a plurality of control lines that include a frame line and an initiator ready line;

determining that the read request requires multiple data phases to complete based on the control lines, said determining including sampling a frame signal on the frame line and sampling an initiator ready signal on the initiator ready line and determining whether the frame signal and the initiator ready signal are asserted concurrently within a predetermined number of clock cycles;

retrieving at least two data phases of data from a data source in response to the read request requiring multiple data phases to complete; and storing the at least two data phases of data in a data buffer; and retrieving only one phase of data in response to the frame signal and the initiator ready signal not being asserted concurrently within the predetermined number of clock cycles.

4. A computer system, comprising:

a first bus having a plurality of control lines that include a frame line and an initiator ready line;

a second bus;

an initiating device coupled to the first bus and being adapted to initiate a read request targeting the target device and adapted to assert a frame signal on the frame line and an initiator ready signal on the initiator ready line;

a target device coupled to the second bus; and a bridge device for communicating between the first and second buses, comprising:

a data buffer; and control logic adapted to receive the read request, sample the frame and initiator ready signals to determine if the read request requires multiple data phases to complete based on the control lines, retrieve at least two data phases of data from the target device, and store the at least two data phases of data in the data buffer in response to the read request requiring multiple data phases to complete;

wherein the control logic is adapted to determine that the read request requires multiple data phases in response to the frame signal and the initiator ready signal being asserted concurrently within a predetermined number of clock cycles; and wherein the control logic is adapted to retrieve only one phase of data in response to the frame signal and the initiator ready signal not being asserted concurrently within the predetermined number of clock cycles.

\* \* \* \* \*